United States Patent
Mahalingam (10) Patent No.: US 8,175,243 B2
(45) Date of Patent: May 8, 2012

(54) SYSTEMS AND METHODS FOR FACILITATING TELECONFERENCING WITHOUT PRE-RESERVATION OF CONFERENCE RESOURCES

(76) Inventor: Padmanabhan Mahalingam, Adyar (IN)

( * ) Notice: Subject to any disclaimer, the term of this patent is extended or adjusted under 35 U.S.C. 154(b) by 800 days.

(21) Appl. No.: 12/100,844

(22) Filed: Apr. 10, 2008

(65) Prior Publication Data

US 2008/0253548 A1   Oct. 16, 2008

Related U.S. Application Data

(60) Provisional application No. 60/922,525, filed on Apr. 10, 2007.

(51) Int. Cl.
*H04M 3/42* (2006.01)

(52) U.S. Cl. .............. 379/202.01; 370/260; 370/261; 379/205.01; 348/14.09

(58) Field of Classification Search .......... 379/201.01, 379/202.01, 205.01, 204.01; 370/259, 260, 370/261, 263, 267; 348/14.08, 14.09
See application file for complete search history.

(56) References Cited

U.S. PATENT DOCUMENTS

| | | | |
|---|---|---|---|
| 6,438,111 B1* | 8/2002 | Catanzaro et al. | 370/260 |
| 6,539,087 B1* | 3/2003 | Walsh et al. | 379/202.01 |
| 2001/0002927 A1* | 6/2001 | Detampel et al. | 379/202 |
| 2005/0069115 A1* | 3/2005 | McKnight et al. | 379/202.01 |
| 2005/0078171 A1* | 4/2005 | Firestone et al. | 348/14.08 |

* cited by examiner

*Primary Examiner* — Antim Shah
(74) *Attorney, Agent, or Firm* — Donald R. Boys; Central Coast Patent Agency, Inc.

(57) ABSTRACT

A teleconferencing system is provided comprising a telephony interface for answering telephony events routed thereto from a router or switch, and one or more signal processing mechanisms coupled to the telephony interface and locatable by the system. The system includes a characteristic of allowing a user to initiate a teleconference to occur on the system, the pending teleconference unbeknown to the system until a first telephony event representing a teleconference participant for the pending teleconference is received at the telephony interface.

6 Claims, 5 Drawing Sheets

SYSTEMS AND METHODS FOR FACILITATING TELECONFERENCING WITHOUT PRE-RESERVATION OF CONFERENCE RESOURCES

CROSS-REFERENCE TO RELATED APPLICATIONS

The present invention claims priority to a U.S. provisional patent application entitled Diner Conferencing and Anonymous Telephony Ser. No. 60/922,525, filed on Apr. 10, 2007, disclosure of which is incorporated in its entirety at least by reference.

BACKGROUND OF THE INVENTION

1. Field of the Invention

The present invention is in the field of telecommunications and pertains particularly to a system and methods for facilitating teleconferencing.

2. Discussion of the State of the Art

In the field of telephony, more and more people are practicing teleconferencing in order to conduct business, learn subject matter, or to socially interact. A teleconferencing session is a group telephony connection or session typically hosted by a teleconferencing bridge capable of isolating users into a group of communicators over one or more channels reserved for the purpose. In typical application, a teleconference service provider allots one or more dial-in telephone numbers to a conference facility like a conference bridge for enabling a multi-party connection. Multi-party connection is generally defined as a group of more than three participants, therefore requiring a conference facility to connect them all in a single session.

A teleconference may be initiated by an organizer who first reserves or schedules a facility from a service provider and obtains one or more conference numbers, access number(s) and pass codes from the provider for authenticating users and enabling them to participate. In a simple case, a conference number is dialed followed by a conference access code to identify a scheduled conference room and a pass code to authenticate the participants. The service provider or the organizer may notify participants of the scheduled event and may provide the dialup telephone number, room or session number (access code) and personal identification number (PIN), or pass code so that when the participants call in they may be registered at the bridge to join the conference. Often an electronic voice-enabled host greets the users and asks each user for the correct code or codes to gain access to the session often referred to as a conference room. Teleconferencing may include video, chat, texting and other functions as well due to the more recent melding of telephone and Internet Protocol (IP) capabilities.

A service hosted teleconferencing facility employs typical security measures to protect sessions for security breach by unrelated third parties. Firstly, each participant must authenticate using a unique number or pass code in addition to dialing the access number to the bridge. Virtual Private Networking (VPN) protocols, Secure Socket Layering (SSL), data encryption, firewall, and other measures may also be a background part of the security for a meeting. In some respects these measures may be configurable or selectable from the viewpoint of the conferencing client based on security needs.

One major drawback of existing services is that a conference client, typically a subscriber to the service, must reserve bridge services ahead of time. The service may require knowledge of the total number of participants ahead of the event. Another problem is that conference-bridging facilities comprise hard or soft switches that have stated capacities and limitations to the number of users that may participate in a given session. Another challenge is that some communication devices and software are not compatible with all services such as VPN access and the like.

More recently, companies have developed systems and methods for making teleconferencing more of a publicly accessible tool but failed to go far enough to make teleconferencing a truly practical solution for communicating.

The inventor is aware of several attempts made in the art to make teleconferencing more user-friendly to the public such as by enhancing security, providing "free conferencing" based on shared revenue, and making access easier from a public network. However, none of these address the central issues of flexibility, usability, and security from the participant/client point of view. Reference is given to some of these applications described in the background section of the priority document incorporated in its entirety by reference in this specification.

As described above, all of the existing systems still require at least some pre-knowledge of parameters of a scheduled or impending conference at the service host and equipment provided for connecting participants. Therefore, what is needed in the art is a system and methods for facilitating teleconferencing on the fly without requiring any service/host or equipment pre-notification of the event.

SUMMARY OF THE INVENTION

A problem stated above is that existing teleconference systems requires an affiliation with a teleconference organizer or client including some pre-knowledge of service requirements of the client including the average number of expected participants in order to allocate adequate resources, which must be reserved in advance to host teleconferences scheduled by the client. Furthermore, the service also undertakes the responsibility of teleconference security by issuing conference codes and pass codes to direct participants to resources and to authenticate those participants. Limitations also exist relative to resource allocation lending to the requirement for pre-knowledge of the size of the teleconference measured in the number of expected participants that will be connected to a switch or conference bridge. The service also assumes notification duties to all participants that are invited or expected to attend teleconferences.

The inventor has therefore considered existing teleconferencing systems and components looking for components and methods of operation that could be leveraged to provide a more flexible teleconferencing experience for the client and service provider or host. Every service-hosted teleconference facility is supported by logical or hard switching and a fixed number of channels to accommodate all of the participants using the facility at any given time. This creates pre-requirements for teleconference organizers relative to teleconference configuration, resource allocation and scheduling. Services are also priced to some extent according to average use requirements, which must be communicated ahead of use of the facility.

In an inventive moment, the inventor conceived a teleconferencing system that allowed teleconference organizers to schedule teleconferences on the system on the fly without notifying or having any pre-affiliation with a teleconference host or provider entity. The inventor further conceived a teleconferencing facility that enabled a service host to eliminate traditional channel and switch limitations relative to the number of participants who may attend a single teleconferencing session. The result was a more flexible requiring less work for teleconference organizers and service providers and better utilization of teleconference resources.

Accordingly, in one embodiment, a teleconferencing system is provided comprising a telephony interface for answering telephony events routed thereto from a router or switch, and one or more signal processing mechanisms coupled to the telephony interface and locatable by the system. The system includes a characteristic of allowing a user to initiate a teleconference to occur on the system, the pending teleconference unbeknown to the system until a first telephony event representing a teleconference participant for the pending teleconference is received at the telephony interface.

According to another embodiment in a teleconferencing system, a voice communications controller is provided comprising at least one port accessible to a voice interface coupled to a network, an event handler for routing incoming events arriving thereto through the port, and one or more digital signal processors arranged in one or more processing banks accessible the event handler. In this embodiment of the invention the incoming events represent voice calls and are associated together in groups according to at least one similar attribute reported by the callers at the voice interface, and wherein those voice calls in each group are interconnected on the one or more processing banks for full duplex communication.

In one aspect of the invention, in a teleconferencing system, a method for setting up a teleconference group is provided and incorporates the steps (a) receiving a telephony event at a voice interface connected to the system, (b) soliciting input of a code from the caller, (c) selecting a processing resource to host communication of the caller, (d) receiving at least one other telephony event in a timely manner at the voice interface wherein solicited input of the same code occurs, and (e) associating the events having the same code together.

In another aspect of the invention, in a teleconferencing system, a method for allocating physically separate processing resources for a single teleconferencing group is provided and incorporates the steps (a) connecting as many participants of the group as is possible to a first processing resource, (b) monitoring the use capacity of that resource, (c) upon nearing full use capacity, selecting another processing resource as an overflow resource, (d) connecting newly discovered participants of the group to the overflow processing resource, and (e) establishing at least one link connecting the participants of the overflow processing resource to the participants of the first processing resource for communication.

DETAILED DESCRIPTION

The inventor provides a system and architecture for facilitating voice teleconferencing in a manner that does not require any pre-knowledge of a pending session at the teleconferencing facility and whereby there is no strict channel or switching limitation on the number of participants that may join a single session. The system and methods of the invention are described below according to the following embodiments.

Figure 1:
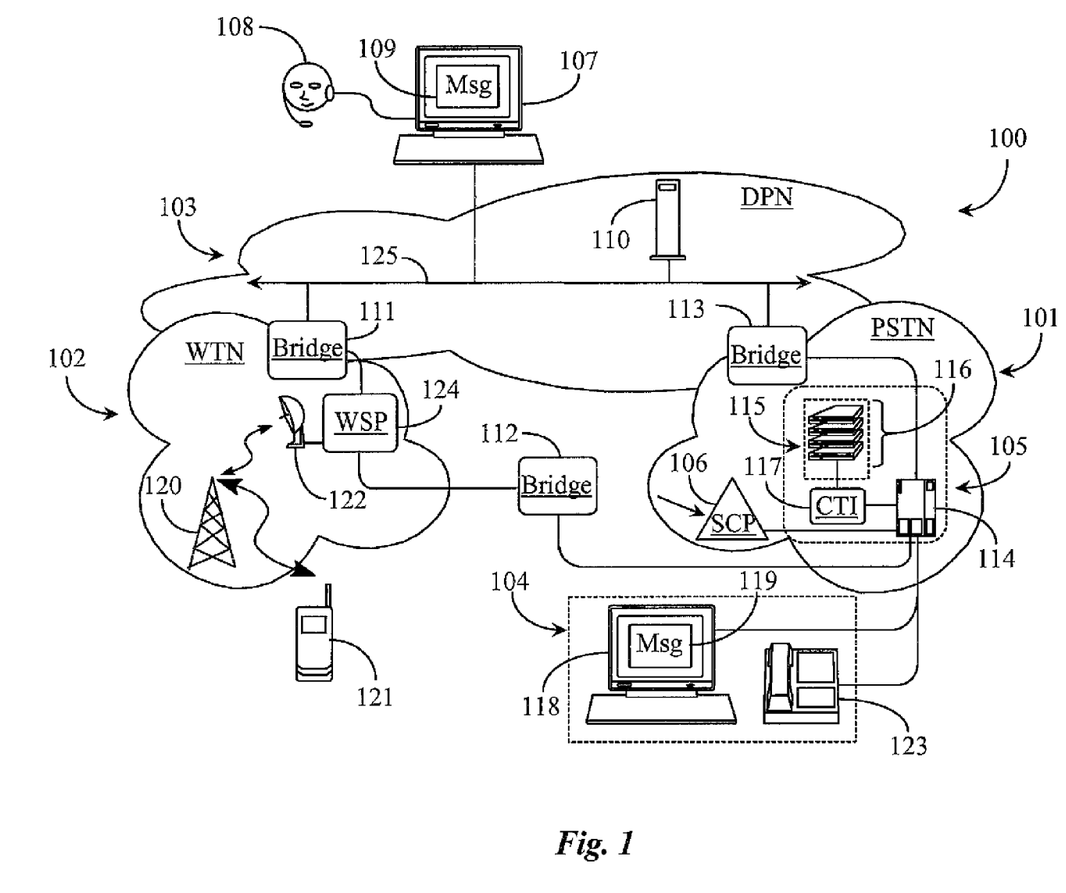
FIG. 1 is an architectural overview of a telecommunications network that supports teleconferencing according to an embodiment of the present invention.

FIG. 1 is an architectural overview of a telecommunications network 100 that supports teleconferencing according to an embodiment of the present invention. Network 100 includes a public-switched-telephone-network (PSTN) 101 connected to a wireless telephone network (WTN) 102, both networks having connection to a data packet network (DPN) 103, which may be the Internet network. One with skill in the art of telephony will appreciate and recognizes recent advances in communications technology allowing for the seamless bridging of otherwise disparate communications networks for the purpose of enhancing network communication in the art.

Network 100 is supported by bridging facilities between the sub-networks. The term bridge shall mean any bridging facility provided for transferring communication between two networks and may include components such as routers, gateways, and other types of network bridges adapted for the purpose. A bridge 111 serves as a communications gateway between WTN 102 and DPN 103. A bridge 112 serves as a communications gateway between WTN 102 and PSTN 101. A bridge 113 serves as a communications gateway between PSTN 101 and DPN 103.

DPN 103 is further illustrated by a network backbone 125 that represents all of the lines, equipment and access points making up the network as a whole. In a case of Internet network 103 there are no geographic limitations to the practice of the present invention. DPN 103 may be referred to as Internet 103 in this example. DPN 103 may also be a local area network (LAN) or some other wide area network (WAN) without departing from the spirit and scope of the present invention.

A network server 110 is illustrated within Internet 103 and connected to backbone 125. Server 110 may represent a contact server, a messaging server, an advertisement server, or the like that may be leveraged in the practice of the invention. Generic server 110 may refer to all of the variances of network server. A user 108 is illustrated in this example having a computer 107 connected to Internet backbone 125 by any Internet access line. There are many known methods for network access including direct line, dial-up, cable modem, broadband, and so on. The exact connection procedure that is used to enable computer 107 to enjoy access to Internet 103 is not relevant to the present invention.

User 108 is wearing a generic telephony headset that is connected by cable to computer 107 for the purpose of enabling the user to practice telephony. It may be assumed that computer 107 has a telephony application and dialer installed thereon and that computer 107 and headset 108 comprise a telephony communications device in one embodiment.

In this example, user 108 has generated a message (Msg.) 109 that will be sent over DPN 103 to potential teleconference participants. User 108 is therefore a teleconference event organizer in this example. A user may organize a teleconference from any point in any of the illustrated networks. User 108 is illustrated as an organizer for discussion purposes only.

PSTN 101 may instead be a private telephone network without departing from the spirit and scope of the present invention. The inventor prefers to illustrate PSTN 101 as a preferred network because of its high public access characteristic and familiarity to most users, which is an advantage of the present invention. PSTN 101 contains a service control point (SCP) 106 representing a telephone switch adapted to route incoming calls represented generally by an arrow to a computer-telephony-integrated (CTI) telephone switch 114. Incoming calls may also arrive directly to switch 114 bypassing any SCP.

Switch 114 may be a private branch exchange (PBX). Switch 114 is enhanced for intelligent call processing by a CTI processor 117 illustrated logically as an external processor connected to switch 114 by CTI link. CTI processor 117 is also connected to an integrated digital voice platform (IDVP) interface 115 known to the inventor. IDVP 115 is adapted to receive calls routed thereto by switch 114. IDVP 115 may have one or more access numbers recognized by switch 114 as destination numbers. Callers arriving at switch 114 may be routed to IDVP 115 by recognition of the number called. In this example, IDVP 115 serves as a teleconferencing facility. IDVP 115, switch 114, and CTI processor or server 117 may all be contained on one piece of equipment without departing from the spirit and scope of the invention. The representation made here is logical only and does not imply any exact connection architecture.

A single service provider 105 that provides telephony-based teleconferencing services may host switch 114, CTI server or router 117, and IDVP 115. In this example, IDVP 115 includes several digital signal processing (DSP) banks 116 that are adapted to host teleconferencing sessions. Other known types of teleconferencing equipment such as switch-based or software-based teleconferencing bridges may be used to practice the invention in part, however IDVP 115 represents a unique approach to flexible teleconference session management that does not exist in current practice. In one embodiment IDVP 115 a digital voice communications controller including a handler for handling incoming events from the network arriving through a port connected to a voice interface coupled to a network.

A user location 104 is illustrated in this example and represents any physical location of a user that may participate in teleconferencing according to embodiments of the invention. Location 104 may be any home or office location or a publicly accessible location. A user operating from location 104 has access to a computer 118 capable of accessing network 103 and a telephone 123. Telephone 123 is connected to switch 114 in PSTN 101 via telephone service line. Computer 118 has access to network 103 through PSTN using a telephone line such as using a dial-up modem and an Internet service provider (ISP). Other methods for connecting computer 118 to DPN 103 are available and known to the inventor.

WTN 102 represents any wireless carrier network through which the PSTN network and the Internet network may be accessed. Network 102 includes standard components such as a cell tower 120 a transceiver 122 connected to a wireless service provider 124. It is duly noted herein that service provider 105 is not limited to providing teleconferencing services based in PSTN 101. Such services may be based in network 103 or in network 102 without departing from the spirit and scope of the present invention. A cellular telephone 121 is illustrated in communication on WTN 102 and may be assumed capable of accessing network 103 using an Internet or network access service that may be provided by WSP 124.

The architecture of communications network 100 should be construed as illustrative for discussion purposes only as one skilled in the art will agree that variances in the architecture and methods for connecting devices may vary widely.

The inventor intends to illustrate the flexibility of access and notification relative to organizing and accessing digital teleconference sessions according to various embodiments of the invention, one of which includes the unique teleconference facility 115 (IDVP).

In practice of the invention, organizer 108 may decide to schedule a teleconference opportunity to occur at some future date and time. Any teleconference facility may participate by hosting the teleconference. A unique aspect of scheduling a teleconference according to an aspect of the invention is that user 108 is not required to notify or coordinate with any teleconferencing facility or service in order to schedule a teleconference session.

In one aspect user 108 may create a conference code for use in establishing a teleconference in a facility and for locating the teleconference for users who dial in to the facility. User 108 may also create a pass code used to authenticate any users who dial into a facility and punch in or speak the conference code into an interactive interface at the facility. The only parameter that is provided by the teleconference facility is the access number enabling callers to connect to the facility for service. In this regard, the facility has no idea of when any teleconferences are scheduled or how many participants will be involved in teleconference sessions.

In one aspect of the invention, the teleconferencing facility has conference bridging equipment that has certain limitations on how many participants may engage in a session. This limit may be somewhat flexible patching chaining conference bridge switches together if need be to provide more channels for users. In another aspect, there are no limitations other than bandwidth for processing the communication channels. This is the case with IDVP 115 and processor banks 116. In either case, callers are treated "on the fly" and are not expected by the service provider before they call in. Therefore, resources at the bridging facility are allotted based on the current demand of callers.

Organizer 108 may send a message, create an advertisement, post a schedule, or create a semi-permanent invitation containing all of the required parameters that users may need to connect to and access the teleconference. In this example organizer 108 sends message 109 to an operator of location 104 and to cellular telephone 121, the message appearing as message 119 on computer 118 at location 104 and not illustrated on cellular telephone 121. The message may be an email message, a voice message, an instant message, a shot message service (SMS) message or some other form. For example, computer 118 may receive an email message while phone 121 receives a voice message.

Electronic messaging, publishing, advertising, telephone, flyer, mailing, or electronic posting or a combination thereof may be preferred methods of notification of an upcoming teleconference for especially large teleconferences like board meetings, lectures, sales meetings, and the like. The exact form of notification chosen may also depend on the rules of the teleconference. For example, if pass codes are used to authenticate invitees then a more private notification method may be preferred. If a teleconference is open to anyone, then public posting or public advertising may be used to convey the invite.

The user operating computer 118 may use telephone 123 to dial the facility access number. The user operating cell phone 121 may dial the access number using the same or a different telephone. Other devices that are enabled for telephony may also be used to practice the invention. Callers may also access facility 115 from Internet 103 by using computer telephony applications and headsets. Internet protocol (IP) telephony can be used to reach any access number. On one embodiment, server 110 is a contact server having a page therein that displays a contact number posted for a teleconference. On with a computer such as computer 107 may access facility 115 through server 110 or directly.

In this embodiment, switch 114 first processes all calls destined to one or more numbers assigned to facility 115. In one aspect, direct inward dialing (DID) is used to route calls to the teleconference facility 115. Other standard telephony information gathering services might also apply. For example, organizer 108 may publish one access number to a facility that is hosting several simultaneous teleconferences. IVR presentation might be made to callers dialing that access number so that they may select which conference to join. An example of such as service might be speed dating by telephone.

Greater security can be enforced by using more than one pass code per participant or by lengthening the conference codes and or pass codes with the concept that more digits are harder to guess for one who does not have the code and is attempting to join a teleconference. Encrypted codes may also be used wherein the facility decrypts the code and provides the correct conference and pass code. The concept is somewhat like a diner hence the term diner conferencing used and explained in the priority document incorporated herein at least by reference and identified in the cross-reference to related documents section of this specification.

Figure 2:
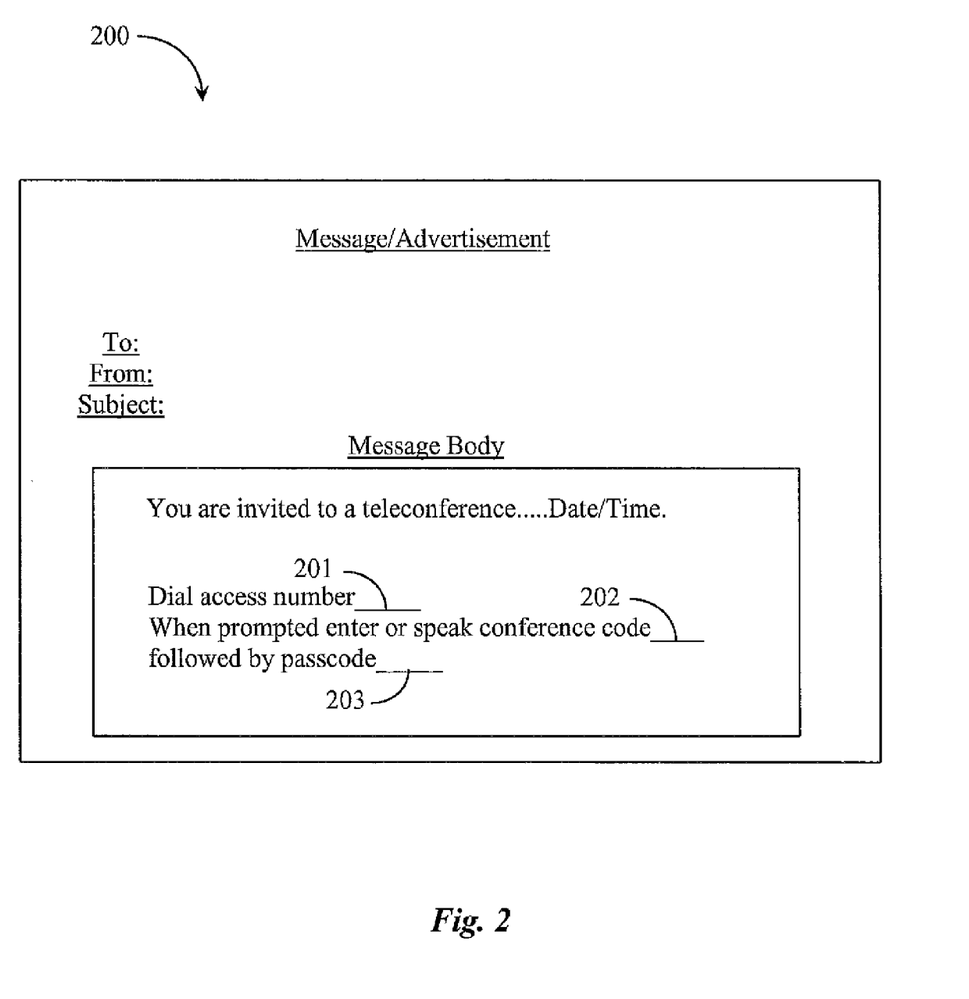
FIG. 2 is a block diagram illustrating a message or media containing participant instruction for joining a teleconference according to an embodiment of the present invention.

FIG. 2 is a block diagram illustrating a message or media 200 containing participant instruction for joining a teleconference according to an embodiment of the present invention. Message 200 is analogous to message 109 and 119 described above. In this example, the message contains a to, from, and subject line and a message body like that of an email message or SMS message. In this case, the message notifies a participant that they are invited to a teleconference giving the date and time.

The message contains all of the information required to join the conference. An access number 201 is the only piece of information obtained from a service provider and it is the telephone number or address of the conference facility. The facility might have a universal resource locator in the case of a facility accessible through Web services. The conference organizer provides a conference code and a pass code included in the instructions. At the time of a teleconference, the organizer may be the first to register at a facility and may provide the conference code and pass code at that time if the facility will thereafter perform authentication. At any rate, the facility will allot processing resources according to conference code (conference nomenclature). In this way, the facility may associate subsequent callers to the correct teleconference.

In one embodiment, message 200 is an advertisement or some other form of visible media that can be distributed or published. There are many possible avenues for notification.

Figure 3:
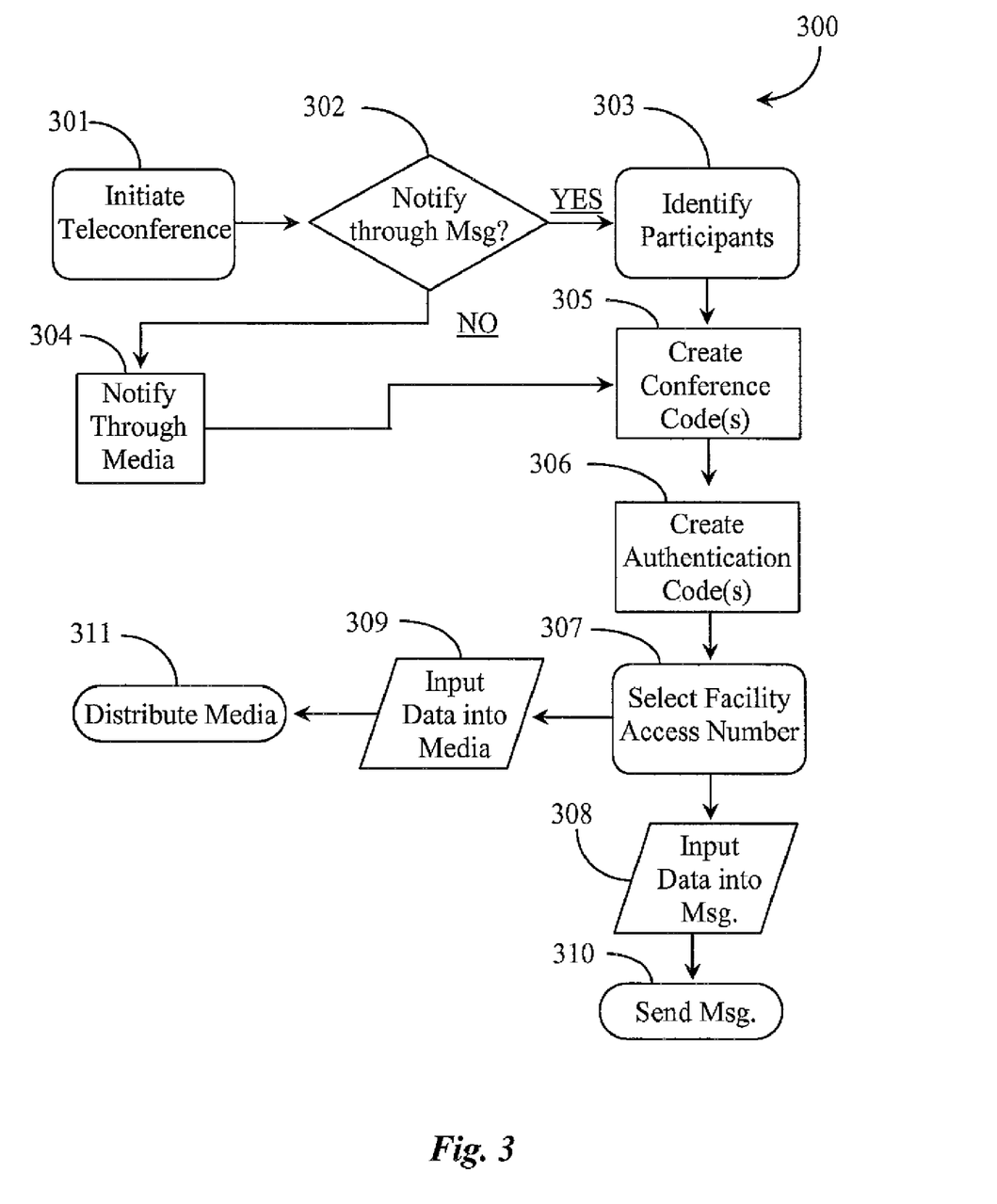
FIG. 3 is a process flow chart illustrating steps for inviting participants to teleconference.

FIG. 3 is a process flow chart illustrating steps 300 for inviting participants to teleconference. At step 301, an organizer initiates a teleconference. At this stage in the process a conference facility is unaware of the undertaking. At step 302 the organizer determines if notification will be made through messaging. If yes at step 302 the organizer identifies participants. Selecting participants from an address list directory, or book is typical for messaging.

If the organizer determines not to use messaging art step 302, then at step 304 the organizer may notify potential participants through media including advertising and other forms. The determination will depend on the nature of the teleconference and participants desired. In either case the organizer creates one or more conference codes at step 305. A conference code identifies the group of participants to the teleconference and the conference itself. There are no limitations for the code other than that the facility will have to recognize it when punched into a touch-tone telephone or spoken into a voice interface. The length and complexity of the code may depend on security scheme.

At step 306, the organizer may create one or more pass codes or authentication codes. These may be PINs, or other numerical and character codes given to participants to use to authenticate themselves after they have accessed the facility and identified the conference they wish to join by giving the conference code. It is noted that the first user to reach the facility and give a conference code is counted as a group. Subsequent callers will be added to the group only if they give the same conference code.

The facility may allot a certain period of time for the teleconference to fill to prevent fraud. For example, a user may simply dial the access number and say provide any random number and the facility will count the caller as entering a conference and will, at least temporarily, allot a processing resource. The conference number and pass code might be fraudulent meaning that it is not a real teleconference that was advertised. The first user may be summarily disconnected if in subsequent minutes a second caller is not found that inputs the same conference code lending credibility to the probability of a real teleconference. However, is some applications, such activity may be encouraged where a caller just "logs in" with a simple code and hope some other callers will guess the code and join into an impromptu teleconference. A teleconference on soccer for soccer players may be started by an individual who just made up the term soccer and was allotted some resources. The next caller who says "soccer" will wind up teleconferencing with the first user and so on. There are many possibilities and applications.

At step 307 the organizer will select the facility access number, which is required for callers to dial into the network facility hosting the teleconferencing resources. At this point the process branches depending on the type of notification where the organizer inputs the data into the message or media, steps 308 and 309. For a message, at step 310 the organizer sends the message. For a media like an advertisement, the organizer distributes the advertisement at step 311.

Figure 4:
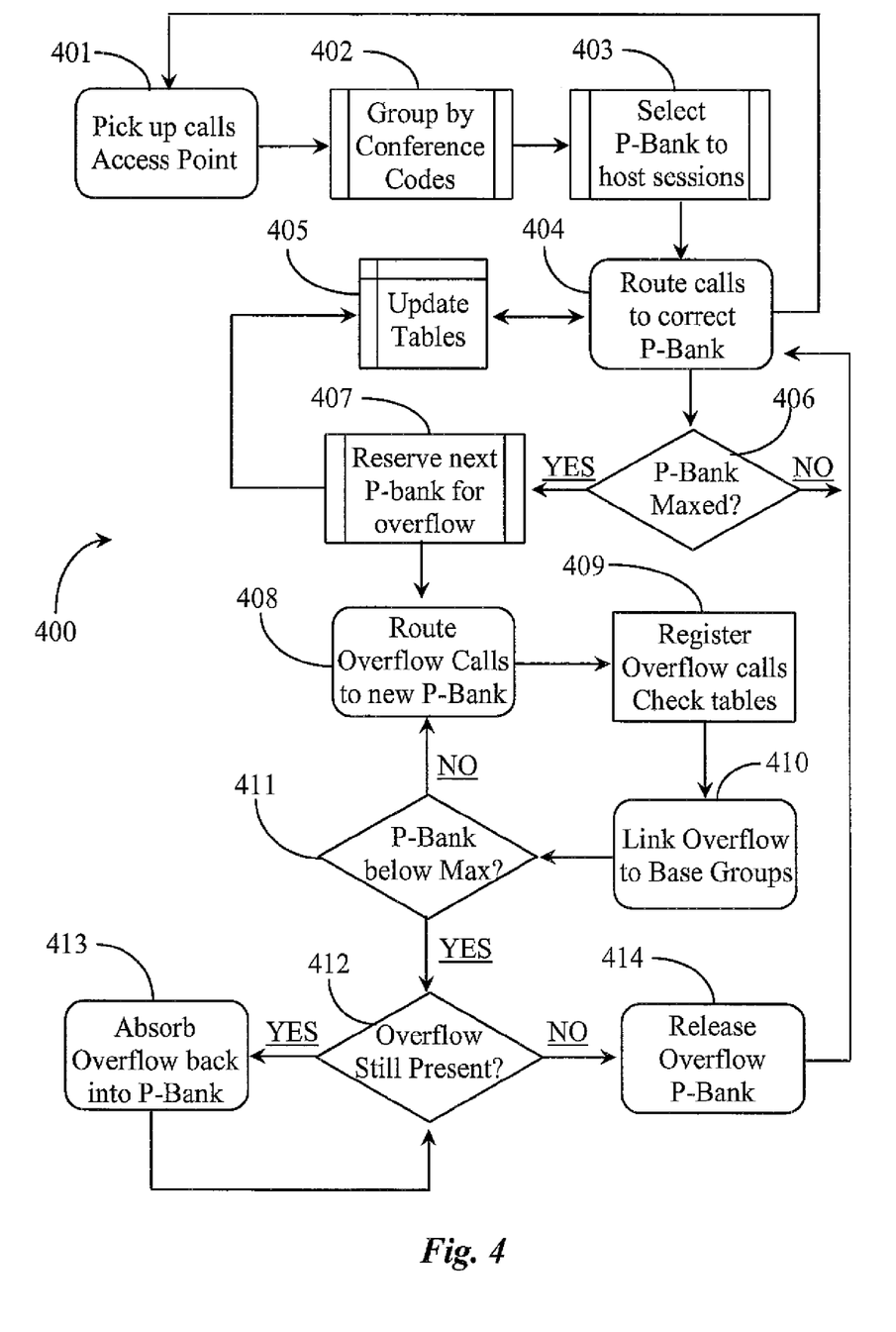
FIG. 4 is a process flow chart illustrating steps for managing conferencing groups in real time according to an embodiment of the present invention.

FIG. 4 is a process flow chart illustrating steps 400 for managing conferencing groups in real time according to an embodiment of the present invention. At step 401, a facility analogous to facility 115 picks up calls to the access point number. These may be calls that are routed from a telephone switch to the facility. The facility may have a voice interface for answering calls via automated attendant. At step 402, the facility via the auto attendant creates teleconference groups by associating same conference codes. For example, caller 3 and caller 7 have input the same code and will therefore be assigned together in one session. Pass codes may or may not be required at this step.

At step 403, the facility selects a processor bank for the purpose of hosting created teleconference sessions. A processor bank is a bank of digital signal processors that provide the capability to connect many users into a same voice session. Each DSP is limited by bandwidth and processing power but not specifically to a number of hard channels. At step 404 the facility routes calls to the correct processor bank selected for hosting teleconference sessions. At step 405, teleconference attendance tables are updated periodically or in real time. Steps 401-405 may form a continuous loop as callers are registered at the facility and are allotted resources. As long as there are available resources on a selected processor bank, the system may register all callers to the same processor bank.

At step 407 the system makes a determination of status of the selected processor bank relative to available resources on the bank. Step 404 may be performed periodically as the loop adding callers and updating tables continues. In one embodiment each processor bank maintains a table of used resources and reports to the facility periodically or when the processor bank is nearing full capacity as defined by a pre-arranged threshold.

At step 406 if the selected processor bank is nearing maximum capacity (Maxed), then the facility selects another processor bank to serve as overflow protection. Both callers belonging to groups registered on the processor bank originally selected and new callers having new conference codes may be routed to the overflow processor bank. The process resolves to step 405 where the tables are updated to include the addition of the overflow processor including the processor address in the group of processor banks managed by the facility.

If the originally selected processor bank is found to have available unused resources then the process resolves back to step 404. At step 408 the facility routes all overflow calls that cannot be hosted on the first processor bank to the selected overflow processor bank. At step 409 the facility registers overflow callers to the overflow processor bank reserved at step 407. At step 409 also checks the existing use tables to identify overflow callers that belong to a group (teleconference) started on the previous processor bank. This is evident to the facility when a caller on the overflow bank has a same conference code of a teleconference in process that is using resources on the original processor bank selected.

It is noted herein that processor banks and overflow banks do not have to be sequentially selected. A random selection may be made such as to any processor having resources available that listed below the max threshold common to all of the banks. At step 410 callers having a same conference code as a teleconference running on another processor are linked for communication across the processor banks using H. 100 logical bus linking. Such links are dynamically created and can also be torn down when not needed.

At step 411 the system monitors to determine if the original processor bank has fallen below the maximum utilization. Use statistics are dynamic and as callers drop off of the system resources again become available. If the system determines that the original processor is not below the maximum threshold, the process moves back to step 408. If at step 411 the system determines that the original processor bank now has available resources due to sufficient drop off of callers the system may determine if overflow callers, defined as callers on another processor bank that are bussed to the original processor bank and teleconference are still present on the overflow processing bank.

If the system determines that overflow is still present at step 412, at step 413 the system may absorb overflow callers back into the processor bank supporting their base group. Step 412 may be performed periodically until there are no more overflow callers. If there is no overflow present on the overflow processor bank the overflow bank may be released at step 414.

One with skill in the art of processor management will appreciate that process 400 is dynamic with continually looping processes occurring simultaneously with other process steps such as checking processor use status or updating tables. Bussing communications between overflow callers and base callers between processors enable the system to scale up to handle very large teleconferences. Any number of processing banks may be involved in hosting numerous teleconferences at any given time. As demand increases, so does resource allotment as demand decreases resources become available again without constraints relative to channels or switching capacities.

Figure 5:
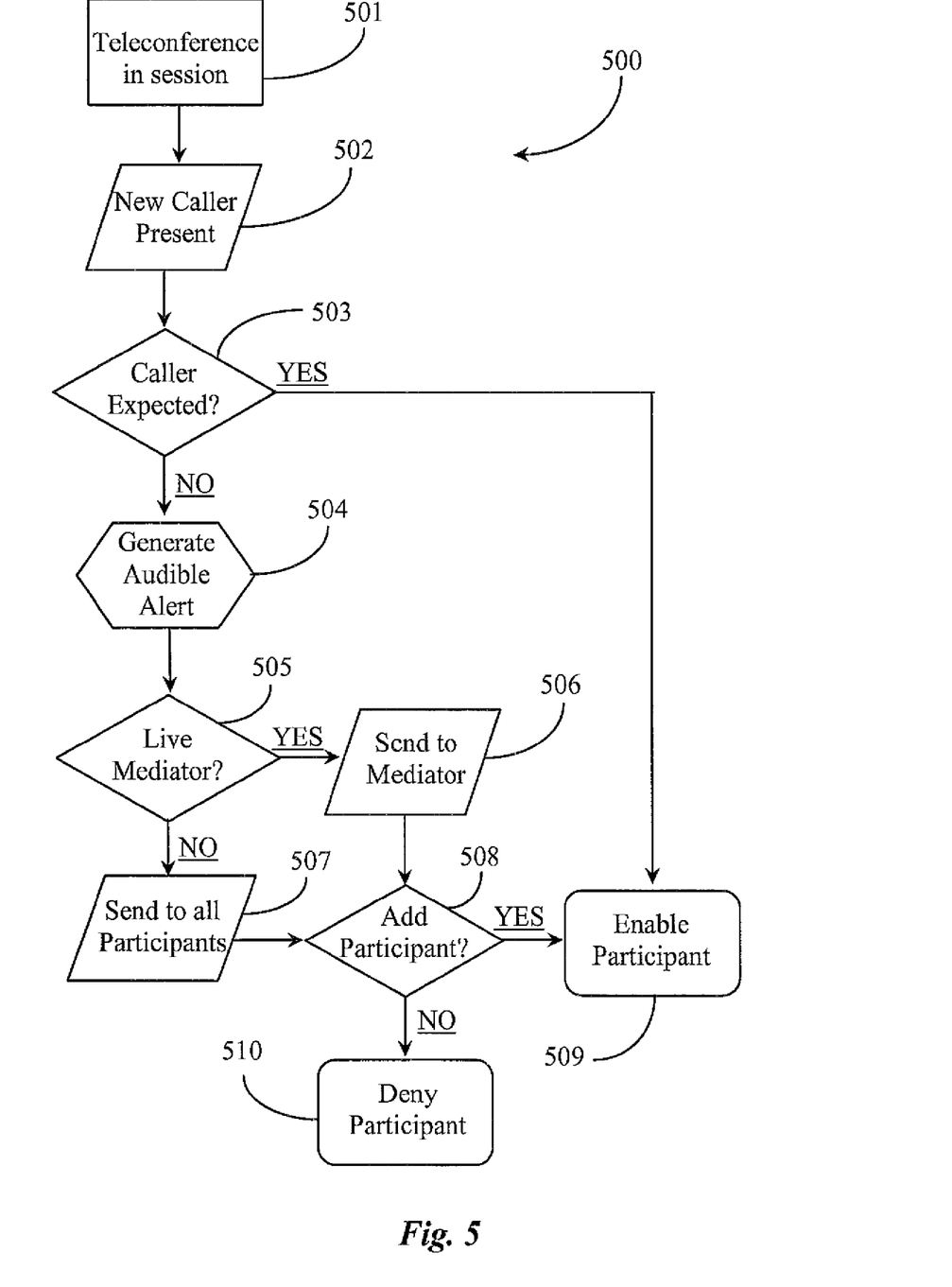
FIG. 5 is a process flow chart illustrating steps for notification of new participants in a conference according to an embodiment of the invention.

FIG. 5 is a process flow chart illustrating steps 500 for notification of new participants in a teleconference according to an embodiment of the invention. A Hyde Park type feature is provided for notifying participants or an organizer of a teleconference to newly arriving participants. At step 501 a teleconference is in session. At step 502 a new caller with a same conference code and perhaps pass code is registered with a teleconferencing group in progress.

At step 503, it is determined whether or not the caller was expected to enter the conference. For example, was the caller invited personally and expected to attend by the conference organizer? Or, was the caller not expected to attend, as might be the case with a low security teleconference open to the public. The feature enables the group or organizer or an assigned individual such as a monitor to enable or deny participation for a caller. At step 503 if the caller was expected then the process skips to step 509 where the caller is enabled automatically to participate.

If at step 503 the caller was not expected, then at step 504 the system may generate an audible alert such as a repetitive door knock, for example. Beeps or other tones may also be used. At step 505 the system may determine if there id+s a responsible mediator or another participant that is charged with monitoring the teleconference for new arrivals.

If at step 505 the system determines that there is a participant responsible for monitoring late arrivals then the audible alert may be sent to that participant and may be heard inn the participant's headset, for example. If the participant also has a visible screen or display, then the new arrival may be noticed. If not, the caller may be found by pressing a button on the telephony dial pad that opens a private 1 to 1 channel between the organizer, monitor, or mediator and the caller.

At step 508 the mediator may talk to the caller and may make a decision whether to enable the caller as a full participant or to deny participation to the caller. Options may exist for partial or limited participation as well. If the mediator, organizer, or monitor decides to enable the caller, the caller is thus enabled at step 509. If at step 508 the organizer decides not to enable the caller, then the caller is denied participation at step 510.

Back at step 505 if the system determines there is no mediator, then the audible alert may be sent to all of the participants where they may hear a knock-knock-knock on their headsets or handset speakers. The process may still move to step 508 were the group may determine by vote if the participant should be enabled or not. In one aspect if there is no one participant in charge of the teleconference determined at step 505 then the process may skip to step 509 and the participant may be automatically included.

Other features may be included with a service offering dynamic teleconference building without departing from the spirit and scope of the invention. Revenue sharing models may be created between teleconference service providers and teleconference hosts. Security may be set by creating conference codes and pass codes that via complexity, reflect the security level. For example a conference code may be a single digit and no pass code is required to practice the present invention. Many varying applications may be created and practiced over a same set of processor banks. Much work typically performed by a teleconference host is eliminated.

It will be apparent to one with skill in the art that the teleconferencing system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A teleconferencing system comprising:
a teleconference bridge in a network, the bridge having an access telephone number or address; and
digital signal processors (DSPs) coupled to the teleconference bridge providing digital resources for managing teleconferences;
characterized in that a first person who is a conference organizer schedules a conference to occur on the system by providing the access telephone number or address to one or more second persons, along with a conference code created by the organizer and unknown to the teleconferencing bridge, and in that, upon any person accessing the teleconference bridge by the access telephone number or address, and entering the conference code, the teleconference bridge records the conference code for the first time, allocates discrete groups of digital signal processors (DSPs) programmed to provide conferencing services, and associates any other person subsequently accessing the teleconferencing bridge and entering the conference code to the conference, and wherein, upon the number of conference participants reaching preset thresholds, adds further resources to handle the greater number of persons in the conference.

2. The teleconferencing system of claim 1 wherein the user sets security level by creating a conference code with a small number of digits for minimum security, and a conference code with greater numbers of digits for higher levels of security.

3. The teleconferencing system of claim 1 wherein the teleconference bridge associates subsequent persons who access the bridge with the conference code to the conference for a preset period of time, then denies further access to the conference.

4. A method for creating and managing a teleconference with a teleconferencing system, comprising the steps of:
(a) scheduling a conference by a first person who is a conference organizer, by providing to one or more second persons an access telephone number or address for the teleconferencing system and a conference code created by the organizer and unknown to the teleconferencing system;
(b) receiving at the teleconferencing system a connection by any person who, after connecting, enters the conference code provided by the organizer, the code previously unknown to the teleconferencing system;
(c) allocating by the teleconferencing bridge discrete groups of digital signal processors (DSPs) programmed to provide conferencing services for a conference, and recording the previously unknown conference code;
(d) associating by the teleconferencing bridge subsequent persons who access the teleconferencing bridge and enter the same conference code to the conference; and
(e) upon the number of conference participants reaching preset thresholds, adds further resources to handle the greater number of persons in the conference.

5. The method of claim 4 wherein security level is managed by a user creating a conference code with a small number of digits for minimum security, and a conference code with greater numbers of digits for higher levels of security.

6. The method of claim 4 wherein the teleconference bridge associates subsequent persons who access the bridge with the conference code to the conference for a preset period of time, then denies further access to the conference.

* * * * *